(12) United States Patent
Inanc et al.

(10) Patent No.: US 11,774,630 B2
(45) Date of Patent: Oct. 3, 2023

(54) SYSTEMS AND METHODS FOR DETERMINING CLEAN INELASTIC AND CAPTURE SPECTRA

(71) Applicant: Baker Hughes Oilfield Operations LLC, Houston, TX (US)

(72) Inventors: Feyzi Inanc, Houston, TX (US); Maxim Vasilyev, Houston, TX (US); Toyli Anniyev, Houston, TX (US); Ezzatollah Esfandiari, Houston, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 17/199,979

(22) Filed: Mar. 12, 2021

(65) Prior Publication Data

US 2022/0291415 A1    Sep. 15, 2022

(51) Int. Cl.
*G01V 5/10*    (2006.01)

(52) U.S. Cl.
CPC .................................. *G01V 5/105* (2013.01)

(58) Field of Classification Search
CPC ......... G01V 5/105; G01V 5/101; G01V 5/104
See application file for complete search history.

(56) References Cited

U.S. PATENT DOCUMENTS

| | | | |
|---|---|---|---|
| 5,481,105 A * | 1/1996 | Gold | E21B 43/04 250/269.4 |
| 5,969,359 A | 10/1999 | Ruddy | |
| 6,207,953 B1 * | 3/2001 | Wilson | G01V 5/104 250/269.4 |
| 6,399,945 B1 * | 6/2002 | Hirayanagi | H01J 37/244 250/397 |
| 7,857,993 B2 | 12/2010 | Dai | |
| 8,039,792 B2 | 10/2011 | Nikitin et al. | |
| 8,642,972 B2 | 2/2014 | Fukuda | |

(Continued)

FOREIGN PATENT DOCUMENTS

FR    2069958    9/1971

OTHER PUBLICATIONS

International Search Report and Written Opinion dated Sep. 2, 2022 in related PCT Application No. PCT/US22/17794.

(Continued)

*Primary Examiner* — David P Porta
*Assistant Examiner* — Fani Polyzos Boosalis
(74) *Attorney, Agent, or Firm* — HOGAN LOVELLS US LLP

(57) ABSTRACT

A method for obtaining nuclear measurement data includes measuring a burst gate source intensity. The method also includes measuring at least one of burst gate neutron count rate or a capture gate neutron count rate at a neutron detector arranged proximate a gamma ray detector. The method further includes determining, based at least in part on the burst gate source intensity and at least one of the burst gate neutron count rate or the capture gate neutron count rate, a normalized neutron count rate. The method also includes determining at least one of an inelastic spectrum or a capture spectrum. The method includes determining based at least in part on the normalized neutron count rate, at least one of a corrected inelastic spectrum or a corrected capture spectrum.

18 Claims, 6 Drawing Sheets

(56) References Cited

U.S. PATENT DOCUMENTS

| | | | |
|---|---|---|---|
| 9,958,560 B1 | 5/2018 | Ogasawara | |
| 2008/0061225 A1* | 3/2008 | Orban | G01V 5/125 250/269.3 |
| 2011/0284731 A1 | 11/2011 | Roscoe | |
| 2012/0046867 A1 | 2/2012 | Faber et al. | |
| 2012/0126105 A1 | 5/2012 | Evans | |
| 2013/0105680 A1* | 5/2013 | Guo | G01V 5/101 250/269.6 |
| 2013/0181137 A1 | 7/2013 | Watanabe et al. | |
| 2013/0268200 A1* | 10/2013 | Nikitin | G01V 5/125 702/8 |
| 2013/0320217 A1 | 12/2013 | Kawaguchi | |
| 2016/0077222 A1 | 3/2016 | Marsolat et al. | |
| 2016/0282505 A1* | 9/2016 | Lee | G01V 5/125 |
| 2016/0290847 A1* | 10/2016 | Gronsberg | E21B 47/16 |
| 2016/0349398 A1 | 12/2016 | Zhou | |
| 2017/0357027 A1 | 12/2017 | Evans | |
| 2019/0049619 A1 | 2/2019 | Kasten | |

OTHER PUBLICATIONS

M. Marinelli et al., "Synthetic single crystal diamond as a fission reactor neutron flux monitor," 2007, Applied Physics Letters, vol. 90, 3 pages.

M. Osipenko et al., "Test of a prototype neutron spectrometer based on diamond detectors in a fast reactor," IEEE Conference, May 23, 2015, http://ieeexplore.ieee.org/stamp/stamp.jsp?tp=&arnumber=7465605&isnumber=7465283, 7 pages.

C. Cazzaniga et al., "Single crystal diamond detector measurements of deuterium-deuterium and deuterium-tritium neutrons in Joint European Torus fusion plasmas," 2014, Review of Scientific Instruments, vol. 85, 8 pages.

A. Pietropaolo et al., "Single-crystal diamond detector for time-resolved measurements of a pulsed fast-neutron beam," Dec. 2010, EPL: A Letter Journal Exploring the Frontiers of Physics, vol. 92, 4 pages.

M. Pillon et al., "Experimental response functions of a single-crystal diamond detector for 5-20.5 MeV neutrons," 2011, Nuclear Instruments and Methods in Physics Research A, vol. 640, pp. 185-191.

M. Rebai et al., "Diamond detectors for fast neutron measurements at pulsed spallation sources," 2nd International Workshop on Fast Neutron Detectors and Applications, Nov. 6-11, 2011, Ein Gedi, Israel, Published May 28, 2012, 17 pages.

* cited by examiner

SYSTEMS AND METHODS FOR DETERMINING CLEAN INELASTIC AND CAPTURE SPECTRA

BACKGROUND

1. Field of the Disclosure

The present disclosure relates to a system and method for downhole measurements, and in particular, to systems and methods for gamma ray measurements.

2. Description of Related Art

Wellbore operations may deploy one or more measurement modalities in order to interrogate and evaluate properties of a downhole formation. For example, measurement modalities may be used to evaluate wellbore integrity, obtain formation properties, and the like. In various embodiments, pulsed neutron generators may be used to emit neutron radiation into the formation and subsequently detect backscatter radiation or gamma emission. While a detector may be particularly suited to detect a certain kind of radiation (e.g., gamma radiation in response to gamma emission), components of the detector may still interact with other forms of radiation. As an example, a gamma ray detector may interact with a neutron, which may generate (e.g., via absorption or scattering) a gamma ray, thereby providing a reading at the detector that is not responsive to properties of the wellbore, but to properties of the detector. This information may distort the acquired spectrum.

SUMMARY

Applicant recognized the limitations with existing systems herein and conceived and developed embodiments of systems and methods, according to the present disclosure, for improved radiation detection by filtering detector born gamma rays.

In an embodiment, a downhole nuclear measurement tool includes a housing and a neutron source, arranged within the housing. The tool also includes a source monitor positioned proximate the neutron source, the source monitor recording emission information for the neutron source. The tool further includes a first detector positioned a distance away from the neutron source, the first detector receiving backscatter radiation, from a formation, in response to neutron emission from the neutron source, and the first detector being a gamma ray detector. The method also includes a second detector, positioned radially outward from the first detector, the second detector receiving the backscatter radiation, the second detector being a neutron detector, wherein the backscatter radiation at the second detector corresponds to a neutron count rate incident on the first detector.

In an embodiment, a downhole nuclear measurement tool includes a housing and a neutron source, arranged within the housing. The tool also includes a first detector positioned a distance away from the neutron source, the first detector receiving backscatter radiation, from a formation, in response to neutron emission from the neutron source, and the first detector being a gamma ray detector. The tool further includes a second detector, positioned radially outward from the first detector, the second detector receiving the backscatter radiation, the second detector being a neutron detector, wherein the backscatter radiation at the second detector corresponds to a neutron count rate incident on the first detector.

In an embodiment, a method for obtaining nuclear measurement data includes measuring a burst gate gamma ray count and spectrum. The method also includes measuring a burst gate neutron count at a neutron detector arranged proximate a gamma ray detector. The method further includes determining, based at least in part on the burst gate source intensity and the burst gate neutrons, capture gate neutrons, a normalized burst gate neutron count rate, and a normalized capture gate neutron count rate. The method also includes determining an inelastic spectrum. The method further includes determining based at least in part on the normalized neutron count rate, a corrected inelastic spectrum and a corrected capture spectrum.

In an embodiment, a method for obtaining nuclear measurement data includes measuring a burst gate gamma ray count and spectrum. The method also includes measuring at least one of burst gate neutron count or a capture gate neutron count at a neutron detector arranged proximate a gamma ray detector. The method further includes determining, based at least in part on the burst gate source intensity and at least one of the burst gate neutrons or the capture gate neutrons, a normalized neutron count. The method also includes determining at least one of an inelastic spectrum or a capture spectrum. The method includes determining based at least in part on the normalized neutron count, at least one of a corrected inelastic spectrum or a corrected capture spectrum.

In an embodiment, a system for formation evaluation includes a tool body and a neutron source positioned within the tool body, the neutron source emitting neutrons into a formation. The system also includes a source monitor, positioned proximate the neutron source, a gamma ray detector, and a neutron detector arranged between the gamma ray detector and at least a portion of the tool body. The system further includes a control system, having a memory and a processor, the memory storing instructions that, when executed by the processor, cause the processor to determine, based at least in part on source monitor data, a burst gate source intensity. The executed instructions also cause the processor to determine, based at least in part on first neutron detector data, a burst gate neutron count. The executed instructions further cause the processor to determine, based at least in part on second neutron detector data, a capture gate neutron count. The executed instructions cause the processor to determine a burst gate correction factor. The executed instructions also cause the processor to determine a capture gate correction factor. The executed instructions further cause the processor to determine a corrected inelastic spectrum, based at least in part on the burst gate correction factor and the capture gate correction factor.

BRIEF DESCRIPTION OF DRAWINGS

The present technology will be better understood on reading the following detailed description of non-limiting embodiments thereof, and on examining the accompanying drawings, in which.

DETAILED DESCRIPTION

Figure 1:
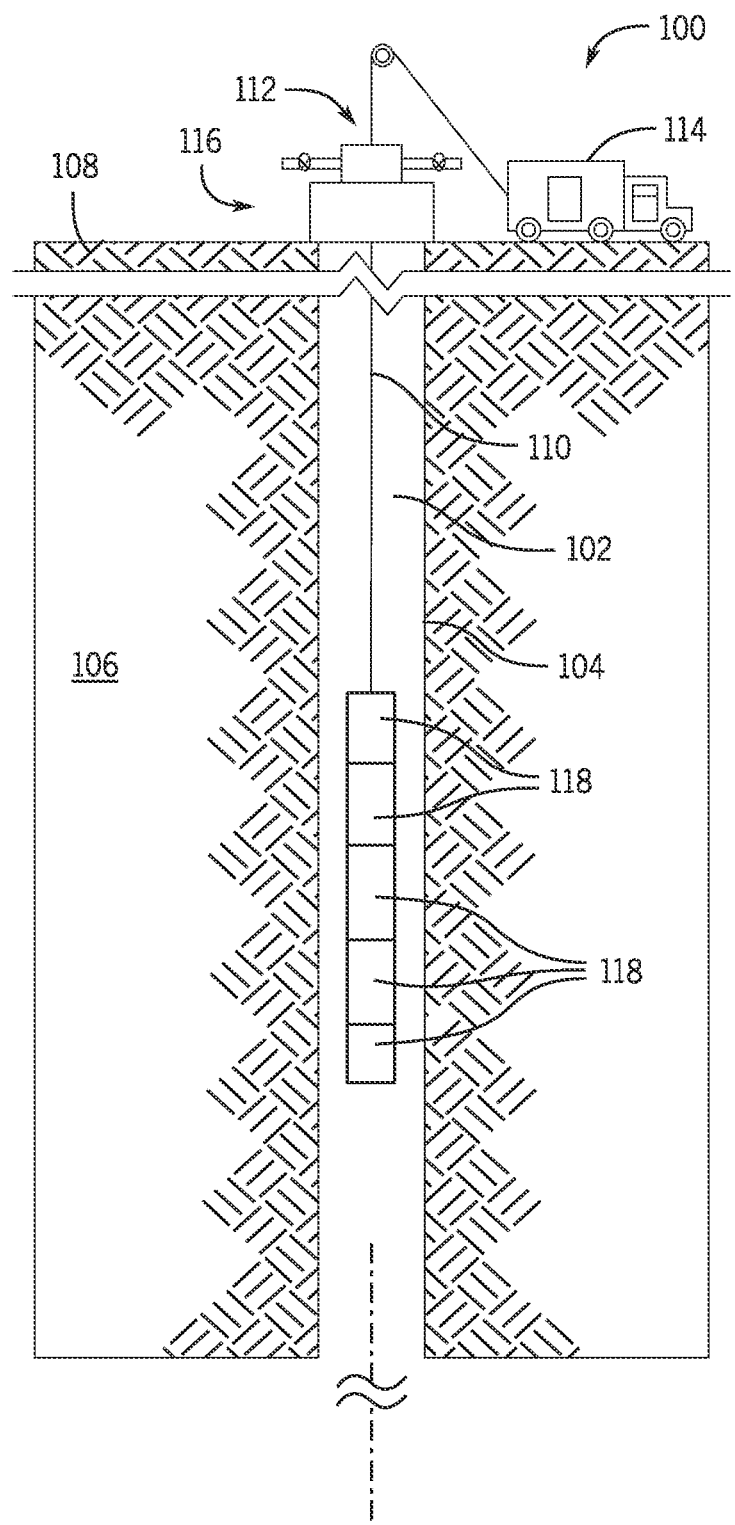
FIG. 1 is a cross-sectional side view of an embodiment of an wellbore system, in accordance with embodiments of the present disclosure.

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose. Additionally, references numerals may be reused for similar features between figures, however, such use is not intended to be limiting and is for convenience and illustrative purposes only.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions.

Embodiments of the present disclosure are directed toward nuclear spectroscopy based on gamma ray energy spectra recorded by scintillation detectors. Various embodiments are directed toward high energy neutron driven nuclear spectroscopy and obtaining inelastic and capture spectra in such spectroscopy work that are free (or substantially free) of gamma rays induced in the detector by the neutrons incident on the detector. The prompt gamma rays born in the detector crystal through neutron reactions usually result in the distortion of the inelastic and capture spectrum. If the measurement is based on a single detector reading such as C/O, Neutron Induced Spectroscopy, the impact of this is going to be large because the spectrum shape will be changing with the shape and magnitude of the neutron count rate incident on the detector. The impact of the detector born gamma rays will be smaller for the measurements based on the ratio of readings from two detector due to both detectors being influenced in the same manner.

Embodiments of the present disclosure are directed toward systems and methods for capturing a "clean" spectrum (e.g., "clean inelastic spectrum," "clean capture spectrum") by determining a neutron count rate at a gamma ray detector and applying a correction factor to account for detector born gamma rays, which may result from reactions with the materials forming a detector crystal. Various embodiments provide one or more neutron detectors positioned proximate, such as circumferentially about, one or more gamma ray detectors. The neutron detectors may be sensitive to fast neutrons, thermal neutrons, or a combination thereof to determine a neutron count rate at the gamma ray detector when the spectrum is acquired. Thereafter, a correction factor, which may be based at least in part on neutron source information, previous measurement data, comparisons, models, or the like, may be applied in order to "clean up" or otherwise remove noise or other distortion from the acquired spectrum, which may be a total spectrum, an inelastic spectrum acquired during a burst gate, and/or a capture spectrum acquired during a capture gate.

FIG. 1 is a schematic cross-sectional view of an embodiment of a wellbore system 100 including a downhole tool 102 arranged within a wellbore 104 formed in a formation 106. The downhole tool 102 is lowered from a surface location 108 via a conveyance system, such as the illustrated wireline 110. In various embodiments, the electric wireline may transmit electric signals and/or energy from the surface location 108 into the wellbore, for example to provide operational power for the tool 102 and/or to transmit data, such as data obtained from sensors arranged on the tool 102. In various embodiments, the tool 102 may be utilized to perform downhole logging operations, such as an imaging tool, a resistivity tool, a nuclear magnetic resonance tool, or any other logging tool that may be used in a downhole environment. It should be appreciated that embodiments exist where the downhole tool 102 is deployed with any other type of conveyance means, including coiled tubing, pipes, cable, and slickline. That is, embodiments of the present disclosure may be utilized in other scenarios, such as measurement while drilling, production logging, and the like.

The wellbore system 100 includes a wellhead assembly 112, shown at an opening of the wellbore 104, to provide pressure control of the wellbore 104 and allow for passage of equipment into the wellbore 104, such as the cable 110 and the tool 102. In this example, the cable 110 is a wireline being spooled from a service truck 114. The wellhead assembly 112 may include a blowout preventer (BOP) 116 (e.g., pressure control device).

In various embodiments, the downhole tool 102 includes a number of segments 118, which may represent different devices or sensors utilized to obtain information from the downhole environment. By way of example only, one segment may relate to a nuclear detection tool that may include one or more radiation sources and detectors to receive signals corresponding to radiation emitted from the formation. The radiation may be naturally occurring or in response to interrogation from the source. The tools associated with these segments 118 may be utilized to determine one or more properties of the formation 106.

Figure 2:
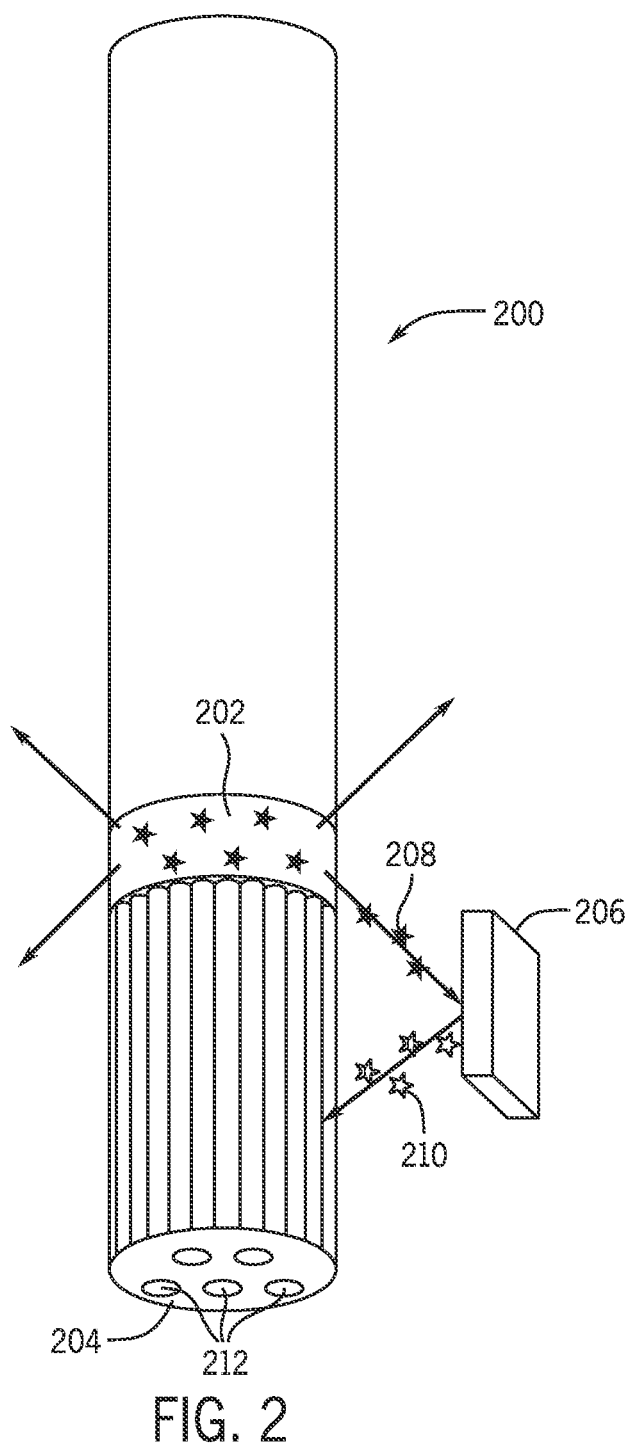
FIG. 2 is a diagram of a prior art tool architecture.

FIG. 2 is a schematic perspective view of an embodiment of a nuclear measurement device 200, which may be a tool forming one or more segments 118 (FIG. 1). The illustrated nuclear measurement device 200 includes a neutron generation unit 202, such as an electric neutron generation unit or a chemical neutron generation unit, and a detection unit 204, which in various embodiments, may be configured to detect various types of radiation, such as gamma rays, x-rays, neutrons, or the like. In various embodiments, the nuclear generation unit 202 is a pulsed neutron generator that emits neutrons for a period of time and then stops emitting neutrons for a second period of time. In the illustrated embodiment, the detection unit 204 is fixed relative to the neutron generation unit 202. That is, movement of the neutron generation unit 202 will also be associated with equal movement of the detection unit 204. In various embodiments, the generation unit 202 includes one or more neutron generators to produce neutrons at an energy of approximately 14.1 MeV, which may be termed "fast" neutrons.

In embodiments, the neutron generation unit 202 is a pulsed generator that emits a neutron burst for a period of time, ceases to emit the neutron count rate for a period of time, and then emits the neutron burst for a second period of time. For example, the high-energy radiation may be emitted from the generation unit 202 toward a target 206, such as a portion of the casing, portion of the cement wall, portion of the formation 106, or any other reasonable downhole feature. The radiation may be emitted for periods of time to enable accumulation of certain types of radiation. For example, as fast neutrons undergo elastic scattering, energy is lost and the neutrons may become thermal neutrons (e.g., neutrons with energy less than 0.8 eV), which may be captured. Neutron capture reactions are accompanied by the emission of capture gamma rays. In various embodiments, the fast neutrons may interact with other nuclei in the formation, leading to inelastic scattering, which may be associated with emission of inelastic gamma rays. Additionally, (n,p) and (n,γ) reactions by the neutrons in the formation 106 may result in unstable nuclei that may decay with emission of activation gamma rays. In embodiments, the detection unit 204 may detect the gamma rays, neutrons, or the like.

In the illustrated embodiment, a neutron flux 208 may be transmitted radially outward from the generation unit 202. It should be appreciated that, initially, the neutron flux 208 may be mostly high energy, fast neutrons that will interact and thermalize over time. However, some of the fast neutrons may thermalize very quickly, and as a result, the neutron flux 208 may include a combination of both fast and thermal neutrons.

In various embodiments, the neutron flux 208 is a circumferential flux moving radially outward from the generation unit 202. However, in various embodiments, the neutron flux 208 may be directed or otherwise targeted toward a particular location. The neutrons forming the neutron flux 208 interact with the target 206 and a backscatter 210 is produced as a result of the interactions. The backscatter 210 may refer to gamma rays formed through inelastic collisions, thermal neutron capture, and the like. It should be appreciated that, in various embodiments, there may be greater amounts of inelastic gamma rays near the start of or during a burst gate, as the high energy neutrons from the neutron generation unit 202 may cause significant inelastic collision, and then as the neutrons thermalize, capture reactions may take place to release the capture gammas.

In an example, high energy neutrons may originate from either chemical neutron sources such as americium-beryllium (AmBe) or californium-252 (Cf-252) sources or from generators using fusion of deuterium atoms (D-D) or deuterium and tritium atoms (D-T) generators. A typical D-T pulsed neutron generator used in the oil field services industry emits 14.1 MeV neutrons, the "fast" neutrons described above, that can induce gamma ray emission through both inelastic and capture reactions in the environment surrounding the neutron source. While pulsed mode operation enables neutrons to slow down to thermal neutron levels after the neutron burst gate is over and gamma rays are purely from neutron capture reactions, recording a pure inelastic gamma ray spectrum is challenging or unrealistic because recorded gamma rays in the burst gate will be a mixture of gamma rays emitted through inelastic reactions and capture reactions. Inelastic gamma ray spectra can be desirable for a variety of different measurement applications, such as neutron induced gamma ray based mineralogy work, C/O measurements, and some others. The quality of the inelastic spectrum plays a role in all those measurements. The typical approach adopted in the industry is to scale the capture gate spectrum with a multiplier and then subtract this spectrum from the total spectrum measured in the burst gate. This scaling and subtraction can take different forms depending on the algorithm used. The end result is usually an inelastic spectrum that is fairly "clean" from the capture gamma rays.

Various configurations, as will be described below, may encounter problems with background readings when the detector scintillator itself emits gamma rays and then records those as a part of the spectrum. This can happen two primary ways. Some crystals have elements that are not stable and they decay with emission of some gamma rays. This forms a constant background of gamma rays emitted by the crystal and then recorded by the crystal. By way of example only, a $LaCl_3$ detector may provide such a constant background reading, with peaks at approximately 789 keV and 1,473 keV.

The other way is gamma rays emitted inside the crystal due to interaction of incident neutrons with the crystal material. Such reactions can drive inelastic gamma rays and/or capture gamma rays. For example, some detectors come with oxygen in the crystal. With such crystals, it is likely to see O-16 inelastic gamma rays emitted in the crystal due to inelastic scattering of very fast neutrons from O-16 nuclei, these inelastic gamma rays are recorded by the crystal. In addition to inelastic gamma rays, there will be prompt capture gamma rays through neutron capture. These capture reactions can happen not only in low energy levels but high energy levels as well. By way of example, (n, Y) cross sections of various elements found in commercial crystals, such as hydrogen-1 (H-1), lutetium-174 (Lu-174), lanthanum-139 (La-139), and gadolinium-157 (Gd-157), along with (n, α) cross sections of boron-10 (B-10) may lead to prompt gamma emissions. The general behavior of cross sections is to decrease with increasing energy. Except H-1 and B-10, many have resonance behavior between 11-10,000 eV energy ranges. In general, capture cross sections are very high in the thermal neutron energy vicinity. That is especially true for Gd-157. Some scintillators such has lanthanum(III) chloride (LaCl3), lanthanum(III) bromide (LaBr3), gadolinium yttrium oxyorthosilicate (GYSO), gadolinium orthosilicate (GSO), lutetium-yttrium oxyorthosilicate (LYSO), and lutetium aluminum garnet (LuAG) have such nuclides in their material composition. All those nuclides will emit prompt gamma rays when they capture neutrons.

As one example, Gd-157 may emit gamma rays at several different energy levels, ranging from approximately (but also less than) 1,000 keV to approximately 7,000 keV. Furthermore, these emissions are from prompt capture gamma rays not only from the thermal neutrons but from relatively high energy neutron capture events, as well. The amount of higher energy capture gamma rays varies with two factors. One is how high the neutron capture cross sections are in the higher energy zones. As an example, scintillation crystals having Gd and Lu will be subjected to significant levels of (n,Y) reactions with high energy neutrons. In contrast, those reactions would be relatively low for La containing crystals due to its relatively low cross section in that higher energy zone.

The other factor is magnitude of emission of prompt gamma rays and their energy levels. Those change with the nuclide capturing the neutrons. Returning to the example of Gd-157, there is a significant amount of gamma ray emission below 2,000 keV, but not much up to 4,000 keV range. For a detector with Gd, an operator should expect many neutron induced gamma rays in the 3,000-6,800 keV range. Some of these will overlap with the data coming from carbon (C), silicon (Si), oxygen (O), iron (Fe), magnesium (Mg), and others. This is undesirable for various downhole measurement operations.

In various embodiments, the detection unit 204 includes one or more radiation detectors 212 that may detect gamma rays, neutrons, or the like. For example, in embodiments where gamma rays are being detected, the detectors 212 may include scintillation counters (e.g., thallium-doped sodium iodide (NaI(Tl), bismuth germanate (BGO), LaBr3, etc.), and the like. It should be appreciated that the various detectors 212 may be calibrated for use within the downhole environment or to detect energy levels within a specific spectrum. Furthermore, there may be a plurality of detectors within the detection unit 204. It should be appreciated that the type of gamma ray may not be readily determined by the detector 212, and therefore, analysis of various energy peaks is utilized to determine likely properties associated with the wellbore. For example, certain energy levels are associated with capture gamma rays released as a result of capture of neutrons by certain nuclides. As noted above, these levels may be overshadowed or impaired by the overlapping emissions from the detectors. Accordingly, embodiments of the present disclosure are directed toward obtaining an inelastic spectrum free (or substantially free) of gamma rays from neutrons and gamma rays born in the crystal. Furthermore, embodiments may be directed toward obtaining a capture spectrum free (or substantially free) of gamma rays born in the crystal. The inelastic spectrum is obtained from the total spectrum measured in the burst gate. The capture spectrum is obtained from the total spectrum measured in the capture gate. The measured total spectrum is made up of different components depending on the detector type and tool configuration.

Figure 3:
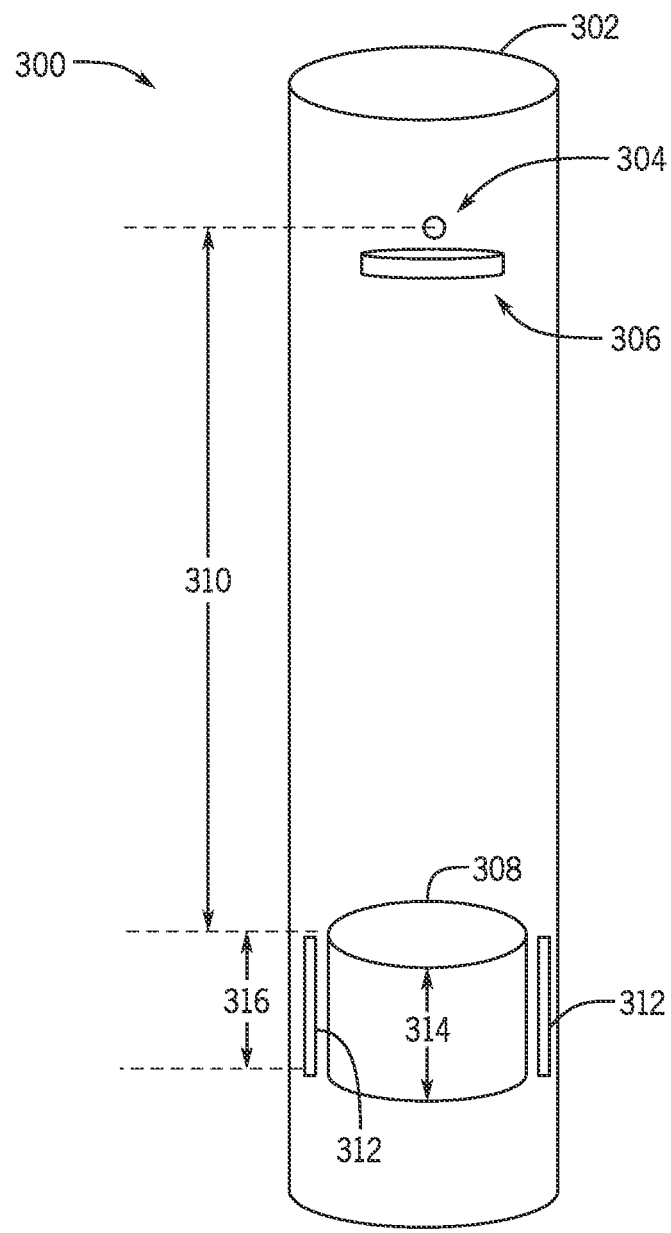
FIG. 3 is a cross-sectional side view of an embodiment of a nuclear measurement tool, in accordance with embodiments of the present disclosure.

FIG. 3 schematic view of an embodiment of a nuclear measurement tool 300 that may be utilized with embodiments of the present disclosure. As will be described herein, the tool includes two sets of detectors, one to detect gamma rays and one to detect neutrons, to determine a neutron count rate at the gamma detector to enable determination and removal of data resulting from detector born gamma rays. The illustrated tool 300 includes a housing 302 that may be used to enclose various components. As will be appreciated, the downhole environment may provide certain challenges, such as high temperatures and/or high pressures, and as a result the housing 302 may be formed by one or more materials to accommodate downhole conditions. Furthermore, while not illustrated in FIG. 3, the housing 302 may include one or more windows to enable emission and receipt of nuclear data.

In this embodiment, a neutron source 304 is arranged within the housing 302 proximate a source monitor 306, which in various embodiments may also be omitted. In various embodiments, the source monitor 306 may track emission from the neutron source 304, such as an intensity of emission. In various embodiments, the source monitor 306 may include a neutron detector. Furthermore, the source monitor 306 may be formed from a group of components, such as a timer, processor, memory, and the like that may record data and then determine one or more properties of the neutron source 304. For example, the source monitor 306 may record a period of time emission (e.g., the burst gate) and then calculate a neutron count rate based on counts received during that period of time.

The illustrated tool also includes a gamma detector 308, which may be a scintillation detector. The gamma detector 308 is positioned a distance 310 away from the neutron source 304 and may include shielding or other components to block emissions from the neutron source 304 from the gamma detector 308. The illustrated embodiment includes a single gamma detector 308, but it should be appreciated that there may be an array of detectors 308. For example, the detectors 308 may be positioned for azimuthal sensitivity, may be stacked axially, or the like.

In various embodiments, the gamma detector 308 is surrounded, at least partially, by neutron detectors 312, which in this embodiment are diamond based neutron detectors. In various embodiments, the detectors 312 may be formed from chemical vapor deposition (CVD) diamond (e.g., diamond detectors) and be utilized to detect ionizing radiation, such as neutrons. It should be appreciated that CVD diamonds are used by way of example only, but any type of synthetic or natural diamond detectors may be utilized. For example, other types of synthetic diamonds may include high-pressure high-temperature processes (e.g., HPHT diamonds), detonation synthesis, high-power ultrasound, or the like. It should be appreciated that a variety of other types of diamond detectors, or other types of radiation detectors, may be utilized. As will be described below, the diamond detectors may enable a measurement of neutron count rate proximate the gamma detector 308, thereby enabling calculation and removal of detector born measurement data. In this embodiment, the detectors 312 are spaced circumferentially about the gamma detector 308, and in various embodiments, may be segmented about the gamma detector 308 for azimuthal sensitivity. In this example, a gamma detector height 314 is approximately equal to a diamond detector height 316, thereby providing coverage for the gamma detector 308.

Figure 4:
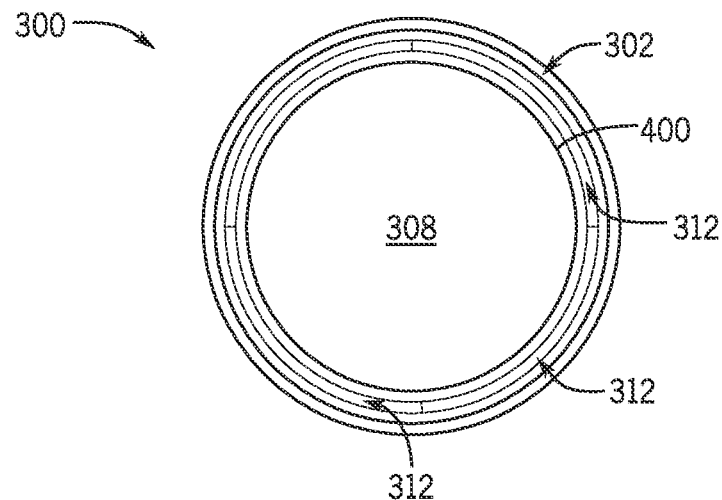
FIG. 4 is a top plan cross-sectional view of an embodiment of a nuclear measurement tool, in accordance with embodiments of the present disclosure.

FIG. 4 is a top plan view of an embodiment of the tool 300 illustrating the neutron detectors 312 positioned circumferentially about the gamma detector 308. In this embodiment, there are four neutron detectors 312, each arranged to cover a span of approximately 90 degrees about the gamma detector 308. As noted above, in various embodiments, there may be more or fewer neutron detectors 312, where more detectors would lead to a smaller span and fewer detectors would lead to a larger span. Furthermore, the single gamma detector 308 is also for illustrative purposes, as other embodiments may include more than one gamma detector 308. In operation, radiation may interact with the neutron detectors 312 prior to interaction with the gamma detector 308. Gamma rays may pass through the neutron detectors 312, or may lose some energy due to attenuation, while neutrons may interact with and be recorded by the neutron detectors 312. As a result, a flux at approximately a surface 400 of the gamma detector 308 may be calculated. Accordingly, the flux may be used to determine a likelihood of detector born gamma emissions, which may enable removal of background radiation measurements, thereby improving the quality of measurements obtained by the gamma detector 308.

Systems and methods disclosed herein are based on measuring neutrons around the scintillation crystal 308 used for downhole measurement operations, such as C/O measurement. Since the neutron induced gamma rays are directly determined by the neutrons in the crystal, measuring the neutron count rate around the detector can be used in removing the neutron induced gamma ray from the acquired spectra. As noted above, the neutron detector 312 may be a diamond detector, which may be selected due to various advantageous properties, but it should be appreciated that embodiments are not limited to only diamond detectors. When evaluating detectors 312 for embodiments of the present disclosure, it is desirable for the detector 312 to have a relatively thin profile so that the gamma ray detector 308 can be surrounded by an array of such detectors (as shown in FIG. 4) without reducing the size of the gamma ray detector significantly. For example, larger gamma ray detectors may lead to improved counting statistics. As shown, the array of detectors 312 in FIG. 4 is positioned between the gamma detector 308 and the housing 302. The tool diameter may be limited in various embodiments, due to the particular wellbore in which it is positioned, and as a result, thicker detectors 308 will either limit the wellbores in which the tool may be deployed and/or reduce a diameter of the gamma ray detector 308. However, the configuration shown in FIGS. 3 and 4 is desirable for measuring neutron count rate incident on the gamma detector, and as a result, the thickness of the detectors 312 may be considered in selecting the detector material.

Another parameter for a neutron detector is measurement capability, for example, the ability to detect fast neutrons, thermal neutrons, or both. As will be described below, in various embodiments thermal neutrons may be eliminated and/or significantly reduced in embodiments of the present disclosure by subtracting the capture spectrum from the inelastic spectrum. That subtraction cannot eliminate the gamma rays induced by the faster neutrons. This component may play an important role in degrading the inelastic spectrum, so correcting the neutron count rate with respect to fast neutrons leads to identification and utilization of neutron detectors that are capable of detecting fast neutrons.

While a number of potential detector materials exist, various embodiments of the present disclosure may be directed toward using diamond detectors, as opposed to other candidates such as, by way of example only, silicon carbide (SiC). Each of the detectors has the capability of detecting fast neutrons, but diamond detectors provide an advantage in terms of counting efficiency. The counting efficiency of the diamond detectors is approximately one order of magnitude larger. It should be appreciated, moreover, that the term diamond detector is not limited to only those materials, as other detector materials may be layered or otherwise utilized in combination with the diamond material. As an example, a lithium fluoride (LiF) layer may be plated onto a diamond detector to provide thermal neutron sensitivity. In such a case, lithium-6 (Li-6) nuclei interact with incident thermal neutrons and the end result is a tritium and alpha particle. Those particles give rise to 2.07 MeV alpha and 2.73 MeV tritium peaks. In addition to the alpha and tritium peaks, the same spectrum will have peaks from fast neutrons.

Accordingly, in selecting materials for the neutron detector, material configurations may be evaluated and changed based on particular energy intervals. In the example of LiF, or a similar neutron sensitive layer, thermal neutron detection may be cut off at a particular energy level, and as a result, thermal neutron reactions will be restricted to higher energy particles. Embodiments of the present disclosure are directed toward obtaining a clean inelastic and/or capture spectrum free (or substantially free) of gamma rays resulting from reactions within the crystal. As discussed herein, there will be both very fast and thermal neutrons present in the crystal during the burst gate. However, the thermal gate will have thermal neutrons only. Accordingly, the response of the diamond detector will change from gate to gate depending on the configuration. For example and as noted above, if the detector comes with a LiF layer such that the configuration is sensitive to both fast and thermal neutrons, the detector will measure all neutrons incident on the detector in the burst gate. In the thermal gate, it will measure only the thermal neutrons. If it is not equipped with a LiF layer, or other layer to provide thermal sensitivity, it will measure only the fast neutrons in the burst gate. It should be appreciated that, in certain situations, fast neutrons may be present in the thermal gate, but the count rates will be negligible.

As noted above, embodiments may include the source monitor 306 in order to normalize neutron count rate. However, it should be appreciated that various embodiments of the present disclosure may omit steps to normalize neutron count rate. Normalization enables corrections to reduce and/or eliminate uncertainties about what is causing changes with the measured neutron count rate. Accordingly, embodiments of the present disclosure provide a source normalized neutron count rate determined from the scintillator vicinity. In that case, count rates obtained from the diamond detector 312 around the gamma detector 308 are normalized to count rates obtained from the source monitor 306. This parameter, x, is used to determine the amount of the corrections to be applied to the spectral. The general form of the corrections is given by equation (1), $$S(E) = \chi \emptyset(E) \quad (1)$$

where $\emptyset(E)$ in equation (1) is spectral shape of the scintillator born gamma rays. $\emptyset(E)$ together with $\chi$ provides the spectral correction to be taken off from the targeted spectrum. It should be appreciated that $\chi$ may be a calculated value, an estimated value, or the like. For example, $\chi$ may be determined based on information from previous wellbore operations or determined using simulations. The targeted spectrum is to be application dependent. For example, measured neutron count rate during the thermal gate would lead to applying the correction to the capture spectrum. As noted, obtaining this information would incorporate a detector 312 with material to provide thermal sensitivity. In this instance, where the detector is sensitive to both thermal and fast neutrons, the correction would have both thermal and fast neutron correction and can be used to clear gamma ray detector born gamma rays from the total spectrum.

Figures 5A, 5B, 5C:
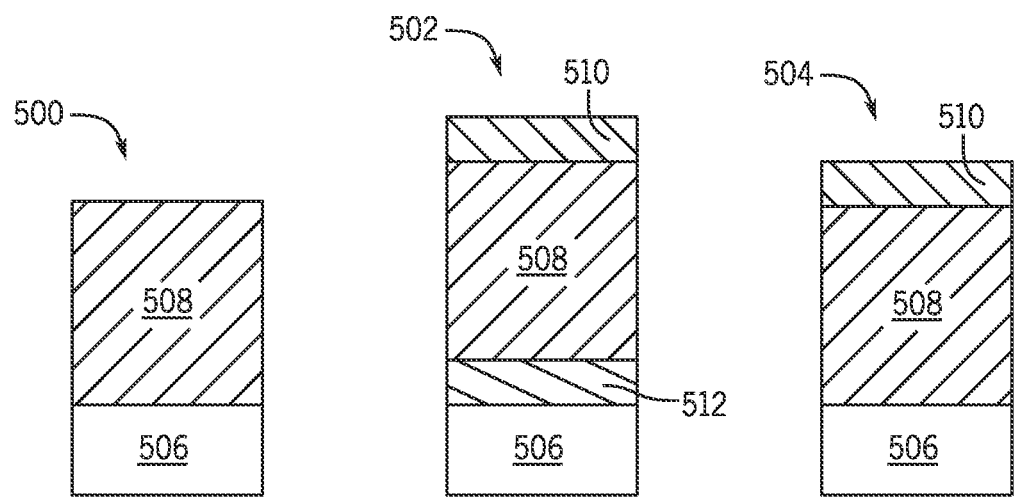
FIGS. 5A-5C are graphical representations of total spectra for nuclear measurements, in accordance with embodiments of the present disclosure.

FIGS. 5A-5C are schematic representations of total spectra for different scenarios that may be encountered during operation of a downhole tool. FIG. 5A shows a first spectrum 500 indicative of operation without detector born gamma emission, FIG. 5B shows a second spectrum 502 indicative of operation having detector born gamma emissions by both high and low energy neutrons, and FIG. 5C shows a third spectrum 504 indicative of operation having detector born gamma emissions by only high energy neutrons.

Turning to the first spectrum 500, in this configuration, the first spectrum 500 corresponds to a total spectrum for the scenario where detector born gamma emissions are negligible or are not present. In such cases, the total spectrum is made up of capture gamma rays 506 and inelastic gamma rays 508 coming from the outside the tool. For this case, obtaining inelastic spectrum can be achieved by subtracting the capture gamma ray spectrum 506 measured in the capture gate after it has been multiplied by a scaling factor. Conventional NaI crystals can be an example for such case because the neutron induced gamma rays in that crystal are negligibly small. However, NaI detectors have several undesirable characteristics, such as high temperature dependencies, fragility, and low resolution.

The second spectrum 502 provides the challenge of including not only the capture gamma rays 506 and the inelastic gamma rays 508, but also the high energy crystal gamma rays 510 and the low energy crystal gamma rays 512. It should be appreciated that reference to the "high energy" and "low energy" crystal gamma rays is related to the energy spectrum of the neutrons in the capture gates. If the neutron energy levels are higher than this capture gate spectrum, they are high energy neutrons. If the method designed for the first spectrum 500 is used for this case, it will be insufficient in obtaining a clean inelastic spectrum because the thermal gate energy spectrum will include capture gamma rays 506 and the capture gamma rays induced in the crystal by the lower energy neutrons 512. In other words, the thermal gate spectrum will be made up of two components, one of which is undesirable and unrelated to the formation (e.g., the low energy crystal gamma rays 512). Therefore, if thermal gate spectrum (e.g., the combination of the capture gamma rays 506 and the low energy crystal gamma rays 512) is subtracted from the total spectrum 502 after scaling, it will still be insufficient to represent only the inelastic gamma rays 508. The resulting inelastic spectrum (e.g., the combination of the inelastic gamma rays 508 and the high energy crystal gamma rays 510) is going to be heavily distorted by the features of the gamma rays induced in the crystal by higher energy neutrons 510. Because neutrons emitted in the burst gate include a significant amount beyond those in the thermal gate, if the crystal materials have higher values for the matching energy ranges of those higher energy neutrons, there will be significant amount of such high neutron energy capture reactions resulting in the fourth component of the total gamma ray spectrum (e.g., the high energy crystal gamma rays 510). When the thermal gate spectrum is subtracted from the total, this component will stay with the resulting spectrum causing issues with the quality of the resulting inelastic spectrum.

The third spectrum 504 shows the case where the detector has been shielded with a lower energy neutron absorbing material such as B-10, Li-6, etc. In such a case, neutrons below the 1 eV range are heavily decreased. When compared to an unshielded case, such as the configuration associated with the second spectrum 502, neutron count rate is about 2 orders of magnitude smaller around the 0.025 eV range. In contrast, there is not much change with the higher energy section of the spectrum beyond a few eV. Accordingly, there will not be (or it is unlikely for there to be) a significant amount of neutron capture reactions for lower energy neutrons, but the higher energy zone neutron capture will stay relatively consistent. As a result, the total spectrum is going to be mainly a 3 component spectrum formed by the capture and inelastic gamma rays 506, 508 and higher energy neutron induced gamma rays born and detected in the crystal 510. The thermal gate neutron spectrum is going to have a very low level of lower energy neutrons and some higher energy neutrons. With that, the amount of neutron induced gamma contribution to the thermal gate gamma ray spectrum will not be to have much crystal born gamma rays. When this spectrum is subtracted (e.g., the capture gamma rays 506) from the total spectrum after multiplying by a scalar, it will not remove the higher energy neutron capture components (e.g., high energy crystal gammas 510), and there will still be a significant amount of pollution in the inelastic spectrum. Accordingly, systems and methods of the present disclosure are desirable to eliminate these additional energy spectra to reduce the noise of the inelastic spectrum.

Figure 6:
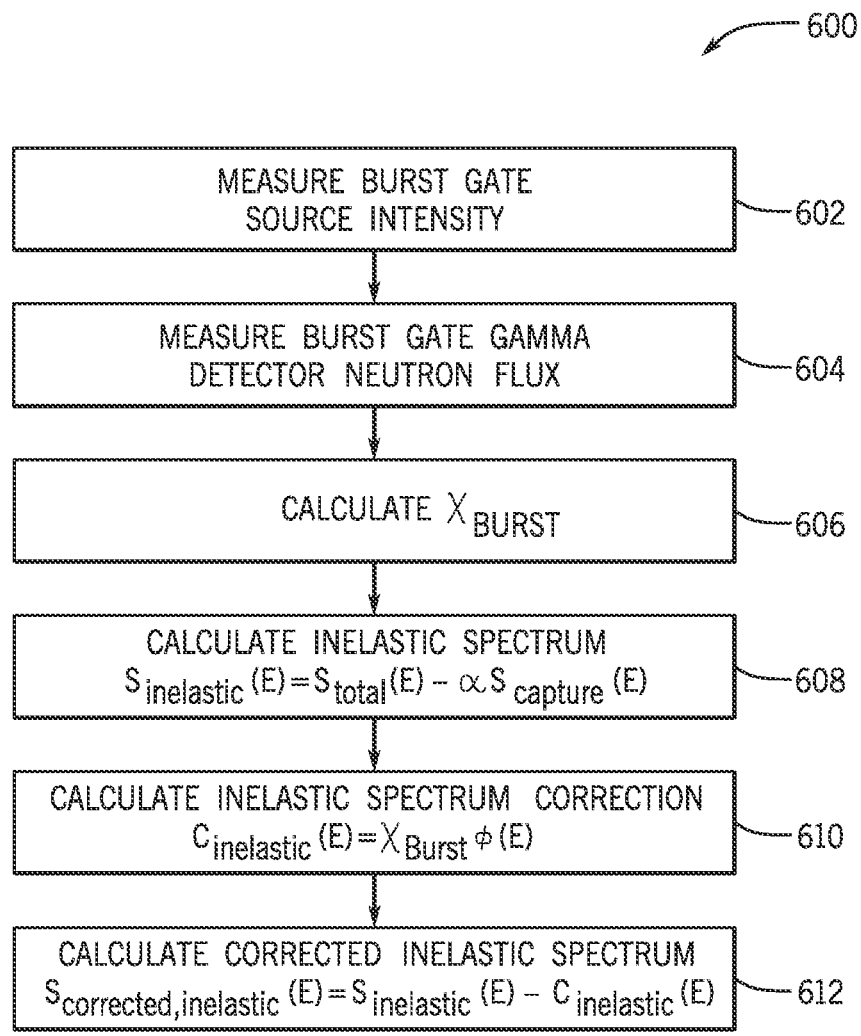
FIG. 6 is a flow chart of an embodiment of a method for determining clean inelastic spectrum, in accordance with embodiments of the present disclosure.

FIG. 6 is a flow chart of an embodiment of a method 600 for correcting a total spectrum to remove detector born gamma rays. It should be appreciated that for this method, and all methods described herein, that there may be more or fewer steps. Furthermore, the steps may be performed in a different order, or in parallel, unless otherwise specifically stated. In various embodiments, one or more steps may be performed via one or more processors that execute instructions stored on one or more non-transitory machine readable memory devices. Furthermore, the steps may be divided between different processor/memory combinations at different locations. For example, in an embodiment, the tool may include a downhole processor and memory that may send or receive information between the surface location and the tool. The tool may receive instructions to activate the source and then record information obtained by the detectors. The same processor/memory combination may also process the data, for example by applying corrections using equation (1), which may or more not include a normalization step. However, in other embodiments, the processor/memory combination on the tool may be utilized to transmit the information to a surface processor/memory combination, which may be at a surface controller or a distributed computing environment.

In this example, a burse gate gamma ray and spectrum is measured 602. For example, the burst gate may correspond to an activation period of the source. The intensity may be measured by one or more source monitors, as described above, and/or may be a function of energy or settings of the source. In various embodiments, neutron count is measured at a neutron detector for the burst gate 604. For example, the neutron detector may be a diamond detector arranged proximate a gamma detector, such as, but not limited to, the configuration shown in FIGS. 3 and 4. The diamond detector may be sensitive to fast neutrons, and in embodiments, also sensitive to thermal neutrons. In this step, however, the diamond detector will provide counts in the burst gate since the fast neutrons will be available only in the burst gate. In other words, during the burst gate, there will not be any counts in the thermal gate, or if some neutrons are thermalized at that time they will be negligible.

In various embodiments, a correction factor is determined 606. For example, $\chi_{burst}$ may be calculated in order to determine the appropriate correction to apply to the spectrum. As noted above, $\chi_{burst}$ may be a calculated value, a predetermined value, an estimated value, or the like. The inelastic spectrum, at the gamma ray detector, is also calculated 608. The inelastic spectrum may be calculated according to equation (2), $$S_{inelastic}(E) = S_{total}(E) - \alpha S_{capture}(E) \qquad (2)$$

where $\alpha$ is a scaling factor, $S_{total}(E)$ is the total spectrum, and $S_{capture}(E)$ is the capture spectrum. It should be appreciated that in some embodiments, an optional normalization step may occur where the neutron count rate at the detector is normalized to source intensity. In this instance, equation (2) will determine the inelastic spectrum by subtracting the capture spectrum, multiplied by the scaling factor, from the total spectrum. The correction $\chi_{burst}$, determined at 606, is used to calculate the inelastic spectrum correction 610. For example, as described above, $\chi_{burst}$ is utilized to determine appropriate correction as shown in equation (1). This correction may be then utilized to determine the corrected inelastic spectrum 612, as shown in Equation (3), where the corrected inelastic spectrum is determined by subtracting the inelastic spectrum correction (C(E)) from the inelastic spectrum obtained at 608.

$$S_{corrected,inelastic}(E)=S_{inelastic}(E)-C_{inelastic}(E) \quad (3)$$

As a result, a clean inelastic spectrum, free (or substantially free) from neutron induced gamma ray detector gamma counts is obtained.

It should be appreciated that a similar process may also be utilized in order to calculate the clean capture spectrum. In this example, a thermal gate gamma count and spectrum is measured. In various embodiments, neutron count is measured at a neutron detector for the thermal gate. For example, the neutron detector may be a diamond detector arranged proximate a gamma detector, such as, but not limited to, the configuration shown in FIGS. 3 and 4. The diamond detector may be sensitive to thermal neutrons and in this step, the fast neutrons will have thermalized such that an insignificant amount of fast neutrons will remain.

In various embodiments, a correction factor is determined. For example, $\chi_{capture}$ may be calculated in order to determine the appropriate correction to apply to the spectrum. As noted above, $\chi_{capture}$ may be a calculated value, a predetermined value, an estimated value, or the like.

The correction $\chi_{capture}$ is used to calculate the capture spectrum correction. For example, as described above, $\chi_{capture}$ is utilized to determine the appropriate correction factor as shown in equation (1). This correction may be then utilized to determine the corrected capture spectrum, as shown in Equation (5), where the corrected capture spectrum is determined by subtracting the capture spectrum correction (C(E)) from the capture spectrum.

$$S_{corrected,capture}(E)=S_{capture}(E)-C_{capture}(E) \quad (5)$$

As a result, a clean capture spectrum, free (or substantially free) from neutron induced gamma ray detector gamma counts is obtained.

Figure 7:
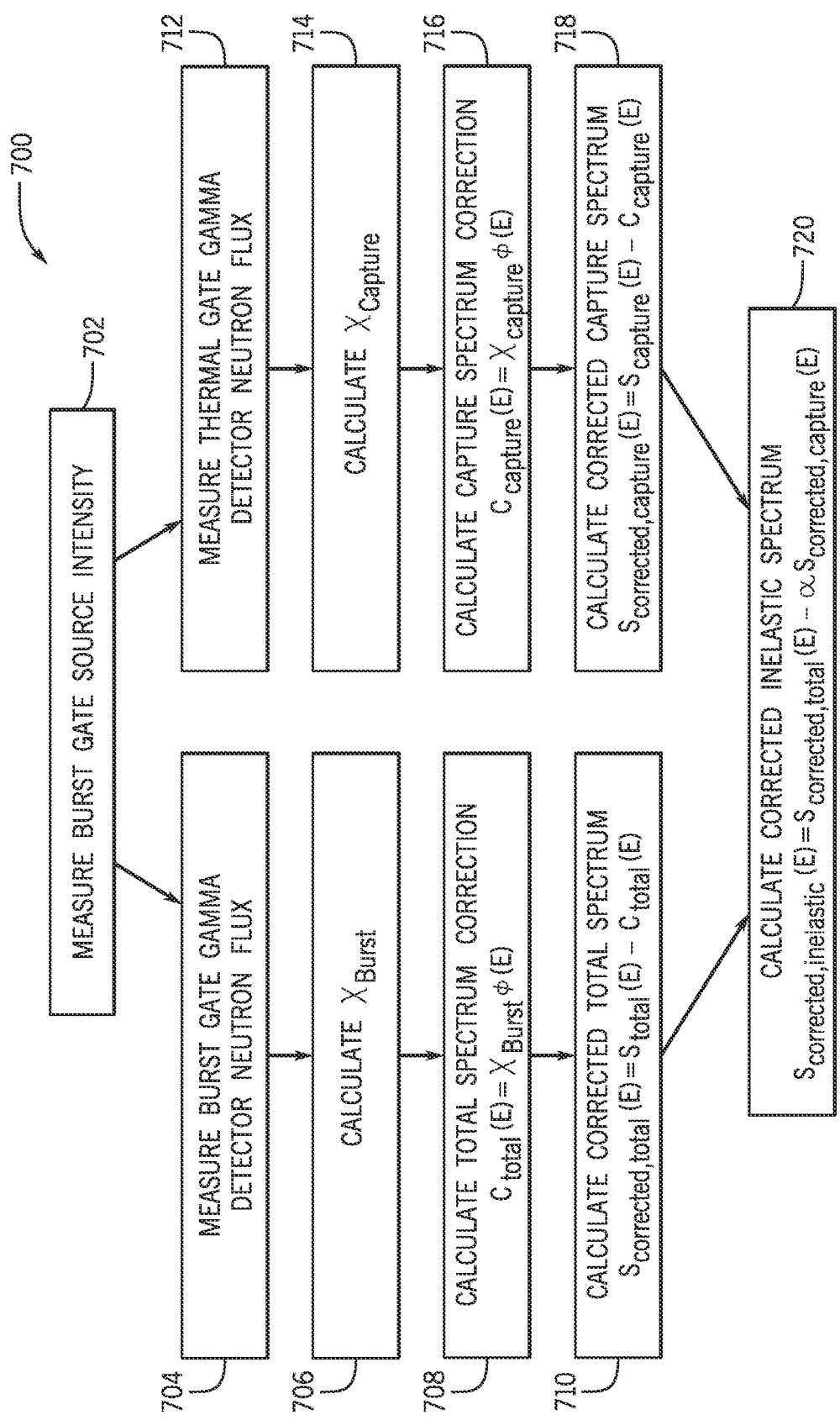
FIG. 7 is a flow chart of an embodiment of a method for determining clean inelastic spectrum, in accordance with embodiments of the present disclosure.

FIG. 7 is a flow chart of an embodiment of a method 700 for obtaining a clean inelastic spectrum using corrections for both fast and thermal neutrons. However, as noted above, it should be appreciated that similar methods may be utilized to determine a clean capture spectrum. In this example, a neutron detector may be used that is sensitive to both thermal and fast neutrons, as described above. In various embodiments, a burst gate source intensity is measured 702. As noted above, the source monitor may be used to measure the source intensity. The illustrated method then includes two different paths in order to calculate a corrected total spectrum and a corrected capture spectrum. As noted above, these steps may be performed in parallel or at least partially in parallel. Additionally, in various embodiments, different steps may be performed at different, but partially overlapping times. For example, while data is acquired during a thermal gate, calculations and processing for burst gate data may be performed.

Starting with the burst gate, the steps are substantially similar to the steps described with the method 600. For example, burst gate neutron count is measured at the detector 704, and a correction factor is calculated 706. A total spectrum correction may then be calculated, as shown in equation (1) 708. Additionally, the correction may be used to determine a corrected total spectrum 710, as shown in equation (3), with the inelastic spectra being replaced with total spectra.

Turning to the thermal gate, thermal gate neutron count is measured at the detector 712. As noted above, this may represent the flux at the diamond detector surrounding the gamma ray detector, where the diamond detector may be particularly selected to include material that enables thermal neutron sensitivity. The correction factor is calculated 714 and a capture spectrum correction is determined, in accordance with equation (1) 716. This correction may be applied to the capture spectrum 718, similar to the process utilized in equation (5), with the inelastic spectra being replaced with capture spectra.

Thereafter, a corrected inelastic spectrum may be calculated 720, as shown in equation (6).

$$S_{corrected,inelastic}(E)=S_{corrected,total}(E)-\alpha\, S_{corrected,capture}(E) \quad (6)$$

As shown in equation (6), the corrected capture spectrum is subtracted from the corrected total spectrum. In various embodiments, the corrected capture spectrum no longer has contributions from low energy gamma rays due to the thermal neutrons. It should be appreciated that, in other embodiments, an additional step of determining a correction factor for removal of thermal neutron crystal contribution may be included.

Accordingly, embodiments of the method 700 obtain two neutron count rate parameters, one for the burst gate and another for the thermal gate. These flux parameters are used to build total and capture spectrum corrections. The corrections then enable calculation of total and capture spectra clean from the neutron induced gamma ray counts. Furthermore, the method provides for determination of the clean inelastic spectrum and/or the clean capture spectrum by subtracting the scaled clean capture spectrum and/or scaled clean inelastic spectrum from the clean total spectrum.

The foregoing disclosure and description of the disclosed embodiments is illustrative and explanatory of various embodiments of the present disclosure. Various changes in the details of the illustrated embodiments can be made within the scope of the appended claims without departing from the true spirit of the disclosure. The embodiments of the present disclosure should only be limited by the following claims and their legal equivalents.

The invention claimed is:

1. A downhole nuclear measurement tool, comprising:
   a housing;
   a neutron source, arranged within the housing;
   a first detector positioned at a distance away from the neutron source, the first detector receiving backscatter radiation, from a formation, in response to neutron emission from the neutron source, and the first detector being a gamma ray detector; and
   a second detector, positioned radially outward from and circumferentially surrounding at least a portion of the first detector, the second detector receiving the backscatter radiation, the second detector being a neutron detector, wherein the backscatter radiation at the second detector corresponds to a neutron flux incident on the first detector.

2. The downhole nuclear measurement tool of claim 1, wherein the second detector is a diamond neutron detector.

3. The downhole nuclear measurement tool of claim 2, wherein the second detector includes a layer, of a material different from diamond, having thermal neutron sensitivity.

4. The downhole nuclear measurement tool of claim 1, wherein the second detector is configured to detect both fast neutrons and thermal neutrons.

5. The downhole nuclear measurement tool of claim 1, wherein the second detector is formed from a plurality of second detector sections, the plurality of second detector sections being segmented over a portion of a circumference of the first detector, the plurality of second detector sections at least partially surrounding the first detector.

6. The downhole nuclear measurement tool of claim 1, wherein the second detector is thinner than the first detector.

7. A method for obtaining nuclear measurement data, comprising:
measuring at least one of a burst gate neutron count or a capture gate neutron count at a neutron detector arranged circumferentially around a gamma ray detector;
obtaining at least one of an inelastic spectrum or a capture spectrum; and
determining, based at least in part on a correction factor, at least one of a corrected inelastic spectrum or a corrected capture spectrum.

8. The method of claim 7, further comprising:
determining the correction factor, based at least in part on at least one of the burst gate neutron count or the capture gate neutron count.

9. The method of claim 7, wherein determining the corrected inelastic spectrum comprises:
determining an inelastic spectrum correction; and
removing the inelastic spectrum correction from the inelastic spectrum.

10. The method of claim 7, wherein the neutron detector has fast neutron sensitivity.

11. The method of claim 7, further comprising:
obtaining the capture spectrum; and
determining a corrected total spectrum; and
determining, based at least in part on the corrected total spectrum and the corrected capture spectrum, the corrected inelastic spectrum.

12. The method of claim 7, wherein determining the corrected capture spectrum comprises:
determining a capture spectrum correction; and
removing the capture spectrum correction from the capture spectrum.

13. The method of claim 7, further comprising:
determining, based at least in part on the corrected inelastic spectrum or the corrected capture spectrum, a formation property.

14. A system for formation evaluation, comprising:
a tool body;
a neutron source positioned within the tool body, the neutron source emitting neutrons into a formation;
a gamma ray detector;
a neutron detector surrounding at least a portion of the gamma ray detector and arranged between the gamma ray detector and at least a portion of the tool body; and
a control system, having a memory and a processor, the memory storing instructions that, when executed by the processor, cause the processor to:
determine, based at least in part on first neutron detector data, a burst gate neutron count;
determine, based at least in part on second neutron detector data, a capture gate neutron count;
determine a burst gate correction factor; and
determine a corrected inelastic spectrum, based at least in part on the burst gate correction factor and a capture spectrum.

15. The system of claim 14, wherein the instructions, when executed by the processor, further cause the system to:
determine, based at least in part on the burst gate correction factor, a total spectrum correction; and
determine a corrected total spectrum.

16. The system of claim 14, wherein the instructions, when executed by the processor, further cause the system to:
determine a capture gate correction factor;
determine, based at least in part on the capture gate correction factor, a capture spectrum correction; and
determine a corrected capture spectrum.

17. The system of claim 14, wherein the corrected inelastic spectrum is a difference between a corrected total spectrum and a scaled corrected capture spectrum.

18. The system of claim 14, wherein the neutron detector comprises:
a diamond detector; and
a layer having thermal neutron sensitivity.

* * * * *